United States Patent [19]

Cavitt

[11] Patent Number: 4,797,432

[45] Date of Patent: Jan. 10, 1989

[54] THERMOPLASTIC EPOXY RESIN AND COATINGS PREPARED THEREFROM

[75] Inventor: Michael B. Cavitt, Lake Jackson, Tex.

[73] Assignee: The Dow Chemical Company, Midland, Mich.

[21] Appl. No.: 122,979

[22] Filed: Nov. 19, 1987

Related U.S. Application Data

[63] Continuation-in-part of Ser. No. 24,938, Mar. 11, 1987, abandoned.

[51] Int. Cl.⁴ .................... C08F 283/10; C08L 63/02; C08K 3/40

[52] U.S. Cl. .................................... 523/172; 523/400; 523/427; 523/428; 523/466; 525/524; 525/525; 525/530; 525/531

[58] Field of Search ................ 525/531, 524; 523/172, 523/427, 466

[56] References Cited

U.S. PATENT DOCUMENTS 4,540,752 9/1985 McFadden .......................... 525/531
4,713,404 12/1987 Cavitt .................................. 523/172
4,721,743 1/1988 Cavitt et al. ........................ 525/524

FOREIGN PATENT DOCUMENTS 100125 6/1982 Japan .................................. 525/531

OTHER PUBLICATIONS

Translation of Jap. Kokai No. 100,125, 6/88.
Handbook of Epoxy Resins, Lee et al, pp. 11-13, 11-14.

*Primary Examiner*—John C. Bleutge
*Assistant Examiner*—David W. Woodward

[57] ABSTRACT

Thermoplastic epoxy resins are prepared by (A) reacting an advanced epoxy resin prepared by reacting a mixture of (1) a relatively low equivalent weight aromatic based epoxy resin and (2) a (meth)acrylate polymer with (3) a dihydric phenol with (4) a monofunctional compound reactive with vicinal epoxide groups; and (B) mixing the product from (A) with the reaction product of (5) a relatively low equivalent weight epoxy resin and (6) a monofunctional compound reactive with vicinal epoxide groups. The resultant product is substantially free of residual epoxide groups. These resins are particularly useful in formulating pavement marking paints.

13 Claims, No Drawings

THERMOPLASTIC EPOXY RESIN AND COATINGS PREPARED THEREFROM

CROSS-REFERENCE TO RELATED APPLICATION

This application is a continuation-in-part of application Ser. No. 024,938 filed Mar. 11, 1987, now abandoned.

FIELD OF THE INVENTION

The present invention pertains to thermoplastic epoxy resins and coatings prepared therefrom.

BACKGROUND OF THE INVENTION

Thermoplastic (non-thermoset) epoxy resins have been employed in the formulation of highway pavement marking paints as disclosed by J. M. Dale in "Development of Lane Delineation With Improved Durability", Report No. FHWA-RD-75-70, July 1975, available from U.S. Dept. of Trans. Off. of Dev., Federal Hwy. Admn., Wash. D.C., 20590. The paint formulations are maintained at elevated temperatures, usually 450° F. to 500° F., during application. While they provide an excellent highway marking paint in terms of abrasive resistance, they are deficient in terms of applicability since they exhibit a substantial increase in viscosity while being maintained at the application temperature.

It would be desirable to have a thermoplastic (non-thermoset) epoxy resin which exhibits a much reduced viscosity increase at elevated temperatures, i.e. it is more thermally stable than those thermoplastic epoxy resins disclosed by J. M. Dale. It is desirable that the increase in viscosity at 450° F. (232° C.) after being subjected to a temperature of 450° F. (232° C.) for 4 hours be not greater than about 10% above the initial viscosity at 450° F. (232° C.).

SUMMARY OF THE INVENTION

The present invention pertains to a thermally stable, epoxy resin resulting from (A) reacting a composition comprising (1) the product resulting from reacting (a) the product resulting from reacting (i) at least one aromatic based epoxy resin having an average of more than one but not more than about 2.1 vicinal epoxy groups per molecule and an equivalent weight of not greater than about 225,suitably not greater than about 200, more suitably not greater than about 195; with (ii) at least one unsaturated monofunctional carboxylic acid: wherein components (i) and (ii) are employed in an amount which provides a ratio of equivalents of component (ii) to equivalent of component (i) of from about 0.0087:1 to about 0.035:1, suitably from about 0.017:1 to about 0.035:1, more suitably from about 0.025:1 to about 0.035:1; with (b) at least one unsaturated acrylate ester or unsaturated methacrylate ester or a combination of such esters;

wherein component (b) is employed in an amount of from about 5 to about 20, suitably from about 7 to about 19, most suitably from about 10 to about 19 percent by weight of the combined quantity of components (a) and (b); with (2) at least one phenolic compound having an average of more than 1 but not more than about 2 phenolic hydroxyl groups per molecule:

(3) optionally, at least one aromatic based epoxy resin having an average of more than 1 but not more than about 2.1 vicinal epoxy groups per molecule and an equivalent weight of not greater than about 225,suitably not greater than about 200, more suitably not greater than about 195: and wherein components (1) and (3) are employed in quantities which provide a ration of epoxy groups from component (3) to epoxy groups from component (1) suitably from about zero:1 to about 12:1, more suitably from about 0.5:1 to about 5:1, most suitably from about 1:1 to about 2:1: and components (1), (2) and (3) are employed in quantities such that the resultant product has an epoxide equivalent weight (EEW) of from about 700 to about 2000, suitably from about 800 to about 1800, more suitably from about 850 to about 1700; each of the aforementioned EEWs being calculated on the basis that the aromatic groups contained therein are free of substituent groups even if they do in fact contain substituent groups:

(B) reacting the product resulting from (A) with (4) a reactant compound having only one group per molecule which is reactive with a vicinal epoxy group selected from —OH, —SH, —COOH and —CO—O—CO— groups:

wherein component (4) is employed in an amount which provides a ratio of groups reactive with a vicinal epoxy group to vicinal epoxy group contained in the product from (A) from about 0.85:1 to about 1.1:1, suitably from about 0.9:1 to about 1:1, more suitably from about 0.95:1 to about 1:1.

Another aspect of the present invention pertains to a mixture comprising (I) from about 55 to about 93, suitably from about 70 to about 92, more suitably from about 75 to about 91 percent by weight based upon the combined weight of components (I) and (II) of the product prepared by (A) reacting a composition comprising (1) the product resulting from reacting (a) the product resulting from reacting (i) at least one aromatic based epoxy resin having an average of more than one but not more than about 2.1 vicinal epoxy groups per molecule and an equivalent weight of not greater than about 225,suitably not greater than about 200, more suitably not greater than about 195; with (ii) at least one unsaturated monofunctional carboxylic acid;

wherein components (i) and (ii) are employed in an amount which provides a ratio of equivalents of component (ii) to equivalent of component (i) of from about 0.0087:1 to about 0.035:1, suitably from about 0.017:1 to about 0.035:1, more suitably from about 0.025:1 to about 0.035:1: with (b) at least one unsaturated acrylate ester or unsaturated methacrylate ester or a combination thereof;

wherein component (b) is employed in an amount of from about 5 to about 20, suitably from about 7 to about 19, most suitably from about 10 to about 19 percent by weight of the combined quantity of components (a) and (b);

(2) at least one phenolic compound having an average of more than 1 but not more than about 2 phenolic hydroxyl groups per molecule; and (3) optionally, at least one aromatic based epoxy resin having an average of more than 1 but not more than about 2.1 vicinal epoxy groups per molecule and an equivalent weight of not greater than about 225, suitably not greater than about 200, more suitably not greater than about 195: and wherein components (1) and (3) are employed in quantities which provide a ratio of epoxy groups from component (3) to epoxy groups from component (1) suitably from about zero:1 to about 12:1, more suitably from about 0.5:1 to about 5:1, most suitably from about 1:1 to about 2:1: and (1), (2) and (3) are employed in quantities such that the resultant product has an epoxide equivalent weight (EEW) of from about 700 to about 2000, suitably from about 800 to about 1800, more suitably from about 850 to about 1700; each of the aforementioned EEWs being calculated on the basis that the aromatic groups contained therein are free of substituent groups even if they do in fact contain substituent groups:

(B) reacting the product resulting from (A) with (4) a reactant compound having only one group per molecule which is reactive with a vicinal epoxy group selected from —OH, —SH, —COOH and —CO—O—CO— groups:

wherein component (4) is employed in an amount which provides a ratio of groups reactive with a vicinal epoxy group to vicinal epoxy group contained in the product from (A) from about 0.85:1 to about 1.1:1, suitably from about 0.9:1 to about 1:1, more suitably from about 0.95:1 to about 1:1; and (II) from about 45 to about 7, suitably from about 30 to about 8, more suitably from about 25 to about 9 percent by weight based upon the combined weight of components (I) and (II) of the product resulting from reacting (5) at least one reactant compound having only one group per molecule which is reactive with a vicinal epoxy group selected from —OH, —SH, —COOH, and —CO—O—CO— groups: with (6) at least one aromatic based epoxy resin having an average of more than 1 but not more than about 2.1 vicinal epoxy groups per molecule and an equivalent weight of not greater than about 225, suitably not greater than about 200, more suitably not greater than about 195:

wherein component (5) is employed in an amount which provides a ratio of equivalents of component (5) per equivalent of vicinal epoxy groups from component (6) of from about 0.87:1 to about 1.1:1, suitably from about 0.92:1 to about 1:1, more suitably from about 0.95:1 to about 1:1: and component (6) is employed in an amount which provides a ratio of equivalents of epoxy groups from component (6) to the equivalents of epoxy groups from component (3) of from about 0.13:1 to about 0.97:1, suitably from about 0.25:1 to about 0.6:1, more suitably from about 0.3:1 to about 0.5:1.

A further aspect of the present invention pertains to a paint formulation containing the aforementioned thermally stable epoxy resins.

The present invention provides thermoplastic epoxy resin formulations suitable for use in highway marking paints which are thermally stable and which have a Mettler softening point in the range of from about 85° C. to about100° C. and a viscosity of from about 140 cps to about 650 cps, more suitably from about 180 cps to about 300 cps, most suitably from about 200 cps to about 250 cps measured at a temperature of 450° F. (232° C.).

DETAILED DESCRIPTION OF THE INVENTION

The (meth)acrylate polymer is prepared by polymerizing one or more (meth)acrylate monomers in an epoxy resin reaction medium, which has been previously reacted with an unsaturated monofunctional carboxylic acid, in the presence of a free radical polymerization catalyst at temperatures of from about 60° C. to about 130° C. for a period of time to complete the polymerization reaction, usually from about 0.5 to about 3 hours. These (meth)acrylate polymers usually have weight average molecular weights in the range of from about 120 to about 450. The molecular weight of the acrylate polymer or methacrylate polymer is not critical; however, the lower molecular weight polymers result in products having decreased dispersion stability; whereas the higher molecular weight polymers result in products having decreased dispersion stability.

Particularly suitable monomers which can be homo- or copolymerized to prepare the acrylate or methacrylate polymers employed herein include those represented by the following Formula I

FORMULA I

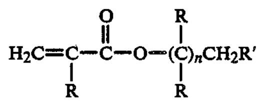

wherein each R is independently hydrogen or an alkyl group having from 1 to about 4 carbon atoms; R' is hydrogen or a hydroxyl group: and n has a value from 1 to about 12. Particularly suitable monomers which can be polymerized to prepare the polymers employed in the present invention include, for example, amyl acrylate, butyl acrylate, ethylhexyl acrylate, hexyl acrylate, hydroxyethyl acrylate, hydroxypropyl acrylate, hydroxyethyl methacrylate, hydroxypropyl methacrylate, isodecyl methacrylate, lauryl methacrylate, propyl acrylate, mixtures thereof and the like. If desired other polymerizable ethylenically unsaturated monomers such as styrene, acrylonitrile, methacrylonitrile, mixtures thereof and the like can be employed as a comonomer in the preparation of the polymer.

Suitable free radical catalysts which can be employed herein include, for example, organic peresters and azo compounds. Particularly suitable catalysts which can be employed herein include, for, example, t-butyl perbenzoate, t-butyl peroctoate, azobisisobutyronitrile, combinations thereof and the like.

The reaction involving the mixture of the aromatic epoxy resin and acrylate polymer or methacrylate polymer with the phenolic hydroxyl-containing compound can be conducted at any temperature between about 150° C. and 225° C., usually between about 175° C. and 200° C. for a time sufficient to complete the reaction, usually between about 0.5 and about 3 hours, more usually between about 1 and about 2 hours. Higher temperatures require shorter reaction times to reach the same level of reaction, while lower temperatures re-

FORMULA III

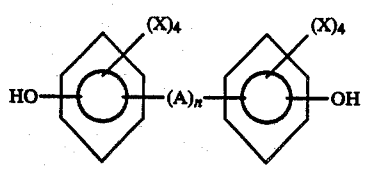

wherein A, X and n are as defined above.

Suitable aliphatic or aromatic monocarboxylic acids, those reactant materials having only one —COOH group, which can be employed herein include, for example, those having from about 2 to about 24, suitably from about 8 to about 20, more suitably from about 12 to about 18, carbon atoms. The aliphatic or aromatic carboxylic acids may also contain in addition to the carboxyl group, other groups which are not reactive with either an aliphatic hydroxyl group or an epoxy group such as, for example, halogen atoms, alkyl or alkoxy groups, and the like. Particularly suitable monocarboxylic acids include, for example, acetic acid, propionic acid, butyric acid, valeric acid, caproic acid, caprylic acid, capric acid, lauric acid, myristic acid, palmitic acid, stearic acid, oleic acid, phenylacetic acid, toluic acid, combinations thereof and the like.

Suitable anhydrides of monocarboxylic acids, those reactant materials containing only one —CO—O—CO— group, which can be employed herein include, the anhydrides of the aforementioned monocarboxylic acids.

Suitable materials having only one —OH group per molecule which can be employed herein include, for example, monohydric aliphatic and aromatic alcohols which may be substituted with any group which does not react with an aliphatic or aromatic hydroxyl group or with an epoxide group, such as, for example, halogen atoms, alkyl or alkoxy groups, and the like. Particularly suitable monohydric alcohols include, for example, methanol, ethanol, propanol, isopropanol, butanol, pentanol, hexanol, ethylene glycol monomethyl ether, propylene glycol monomethyl ether, ethylene glycol monoethyl ether, propylene glycol monoethyl ether, combinations thereof and the like. Particularly suitable monohydric aromatic alcohols include, for example phenol, alkyl phenols, such as, for example, nonyl phenol, t-butyl phenol, cresol, combinations thereof and the like.

Suitable thiols, reactant materials containing an —SH group, which can be employed herein include, for example, hydrogen sulfide, thiopropane, thiopentane, combinations thereof and the like.

Water is also suitable as the monofunctional compound which can be reacted so as to substantially eliminate the epoxy groups from the product of the present invention. When water is employed, the epoxide groups are hydrolyzed rather than being converted to ethers, esters, thioethers and the like.

Suitable catalysts for effecting the reaction between the epoxy resin, the phenolic hydroxyl-containing materials and monocarboxylic acids or monohydric alcohols or anhydrides of monocarboxylic acids include, for example, those disclosed in U.S. Pat. Nos. 3,306,872: 3,341,580; 3,379,684; 3,477,990: 3,547,881; 3,948,855: 4,048,141; 4,093,650; 4,131,633; 4,132,706: 4,171,420: 4,177,216: 4,302,574; 4,320,222: 4,366,295 and 4,389,520 all of which are incorporated herein by reference.

Particularly suitable catalysts are those quaternary phosphonium and ammonium compounds such as, for example, ethyltriphenylphosphonium chloride, ethyltriphenylphosphonium bromide, ethyltriphenylphosphonium iodide, ethyltriphenylphosphonium acetate, ethyltriphenylphosphonium diacetate (ethyltriphenylphosphonium acetate·acetic acid complex), tetrabutylphosphonium chloride, tetrabutylphosphonium bromide, tetrabutylphosphonium iodide, tetrabutylphosphonium acetate, tetrabutylphosphonium diacetate (tetrabutylphosphonium acetate·acetic acid complex), butyltriphenylphosphonium tetrabromobisphenate, butyltriphenylphosphonium bicarbonate, benzyltrimethylammonium chloride and tetramethylammonium hydroxide, combinations thereof and the like.

The compositions of the present invention can also contain, if desired, fillers, pigments, dyes, colorants, solvents or diluents, thickeners, light stabilizers, combinations thereof and the like.

Suitable pigments, dyes or other colorants which can be employed herein include, any of those which will provide the coating or paint with the desired color, such as for example, titanium dioxide, lead chromate, zinc chromate, chrome green, phthalocyamine green and blue, iron oxide, combinations thereof and the like. Suitable amounts of pigments, dyes or other colorants or combinations thereof include, for example from about 5 to about 25, suitably from about 10 to about 23, more suitably from about 12 to about 20 parts by weight based upon the amount of non-volatile components employed in the paint or coating formulation.

Suitable fillers which can be employed herein include, for example, calcium carbonate, talc, powdered or flaked zinc or alumina, powdered or flaked glass, titanium dioxide, colloidal silica, combinations thereof and the like. The fillers are usually employed in quantities of from about 5 to about 30, suitably from about 5 to about 27, more suitably from about 5 to about 25, percent by weight based upon the weight of the total formulation.

Suitable light reflective materials which can be employed herein include, for example, glass beads, glass flakes, glass fibers, glass bubbles, combinations thereof and the like. The light reflective materials are usually employed in quantities of from about 10 to about 40, suitably from about 13 to about 40, more suitably from about 15 to about 37, percent by weight based upon the weight of the total formulation.

Suitable solvents or diluents which can be employed herein to prepare solvent borne coatings or paints include, for example, ketones, aromatic hydrocarbons, chlorinated hydrocarbons, combinations thereof and the like. Particularly suitable solvents include, for example, acetone, methyl ethyl ketone, methyl isobutyl ketone, cyclohexane, cyclohexanone, methylene chloride, combinations thereof and the like. These solvents, when employed are employed in quantities which provide the compositions with the desired application viscosity, usually in amounts of from about 10 to about 50, suitably from about 15 to about 40, more suitably from about 20 to about 35 based upon total paint or coating formulation including the solvent.

The following examples are illustrative of the invention but are not to be construed as to limiting the scope thereof.

quire longer reaction times to reach the same level of reaction. In this reaction, in order to prepare a product having the desired equivalent weight, components (1), (2) and (3), are usually employed in amounts which provide a ratio of phenolic hydroxyl groups from component (2) to vicinal epoxide groups contained in components (1) and (3) combined of from about 0.6:1 to about 0.9:1, suitably from about 0.65:1 to about 0.85:1, more suitably from about 0.7:1 to about 0.8:1.

When the EEW of the product resulting from the reaction of the mixture of the relatively low equivalent weight epoxy resin and the acrylate or methacrylate polymer with a phenolic hydroxyl-containing compound is less than about 700, the resulting formulated paint will become tacky and tend to discolor due to highway traffic. This tendency is more predominant when the formulated paint is applied in warmer climates or in the summer time in colder climates.

When the EEW of the product resulting from the reaction of the mixture of the aromatic epoxy resin and the phenolic hydroxyl-containing compound is greater than about 2000, the resulting formulated paint will become difficult to apply with conventional spray equipment which is currently employed.

The reaction between the product resulting from reacting the mixture of the relatively low equivalent weight epoxy resin and the acrylate or methacrylate polymer with a phenolic hydroxyl-containing compound and the monofunctional compound reactive with vicinal epoxide groups can be conducted at any temperature between about 120° C. and 200° C., usually between about 150° C. and 200° C. for a time sufficient to complete the reaction, usually between about 1 and about 4 hours, more usually between about 2 and about 3 hours. Higher temperatures require shorter reaction times to reach the same level of reaction. At temperatures below about 120° C., the viscosity becomes too high for effective agitation in conventional equipment. At temperatures above about 200° C. undesired side reactions occur which could lead to high viscosity in the formulated paint. In this reaction, in order to prepare a product having the desired equivalent weight, component (4) is usually employed in an amount which provides a ratio of reactive monofunctional groups from component (4) to vicinal epoxide groups contained in the product resulting from reacting the mixture of the relatively low equivalent weight epoxy resin and the (meth)acrylate polymer with a phenolic hydroxyl-containing compound of from about 0.85:1 to about 1.1:1, suitably from about 0.9:1 to about 1:1, more suitably from about 0.95:1 to about 1:1.

The reaction between the relatively low equivalent weight aromatic epoxy resin and the monofunctional reactant compound can be conducted at any temperature between about 150° C. and 210° C., usually between about 170° C. ahd 190° C. for a time sufficient to complete the reaction, usually between about 1 and about 6 hours, more usually between about 1 and about 3 hours. Higher temperatures require shorter reaction times to reach the same level of reaction, while lower temperatures require longer reaction times to reach the same level of reaction. At temperatures below about 150° C., the viscosity becomes too high for effective agitation in conventional equipment. At temperatures above about 210° C., undesired side reactions may occur which could lead to high viscosity in the formulated paint.

A catalyst is usually employed to catalyze the reaction between the vicinal epoxy groups and the phenolic hydroxyl-containing compound and the reaction between that product and the monofunctional reactant material. The catalyst is employed in catalytic amounts which depends upon the particular components which are being reacted together. However, usually, the catalyst is employed in amounts which correspond to from about 0.0004 to about 0.002, more usually from about 0.0005 to about 0.001, most usually from about 0.0006 to about 0.0009, mole of catalyst per epoxy group contained in the reaction mixture. At catalyst amounts below about 0.0004 mole per epoxy group, the reaction rate becomes very slow and if the catalyst amount is very low, the reaction may be incomplete. At catalyst amounts above about 0.002 mole per epoxy group, the reaction rate can become so great that the energy of the reaction cannot be removed fast enough to stop the undesired side reactions that could lead to gelation.

Suitable relatively low equivalent weight aromatic based epoxy resins which can be employed herein include, but are not limited to those represented by the following Formula II

FORMULA II

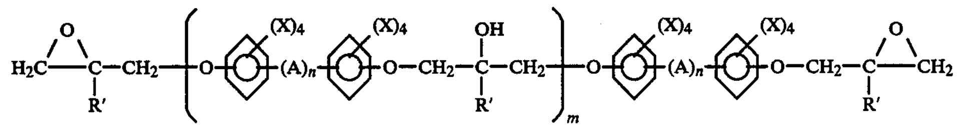

wherein each A is a divalent hydrocarbyl group having from 1 to about 12, preferably from 1 to about 6 carbon atoms, —SO—, —SO$_2$—, —O—, or —CO—; each R' is independently hydrogen or a hydrocarbyl group having from 1 to about 4, preferably from 1 to about 2 carbon atoms: each X is independently hydrogen, a hydrocarbyl or hydrocarbyloxy group having from 1 to about 8, preferably from 1 to about 4, carbon atoms, or a halogen, preferably chlorine or bromine: m has an average value from about zero to about 0.5: and n has a value of zero or 1.

Particularly suitable relatively low equivalent weight aromatic based epoxy resins include, for example, the diglycidyl ethers of bisphenols such as, for example, the diglycidyl ether of biphenol, the diglycidyl ether of bisphenol A, the diglycidyl ether of bisphenol F, combinations thereof and the like.

The term hydrocarbyl as employed herein means any aliphatic, cycloaliphatic, aromatic, aryl substituted aliphatic or cycloaliphatic group, or aliphatic or cycloaliphatic substituted aromatic group.

Suitable phenolic materials containing an average of more than one aromatic hydroxyl group which can be employed herein include, for example, but not limited to those represented by the following Formula III

MATERIALS EMPLOYED IN THE EXAMPLES AND COMPARATIVE EXPERIMENTS

EPOXY RESIN A is the diglycidyl ether of bisphenol A having an epoxide equivalent weight (EEW) of 182.8.

EPOXY RESIN B is the diglycidyl ether of bisphenol A having and EEW of 182.

EPOXY RESIN C is a diglycidyl ether of bisphenol A containing 19.8% by weight of a homopolymer of 2-ethylhexyl acrylate. The product is prepared in the following manner.

To a reaction vessel is charged 1200 gms (6.629 epoxy equiv.) of a diglycidyl ether of bisphenol A having an EEW of about 181, 15 gms (0.174 mole) of methacrylic acid and 0.5 gm (0.0008 mole) of Catalyst A and reacted for 1 hour at a temperature between 100° C. and 120° C. After this reaction is complete, a solution of 1.5 gms (0.0077 mole) of t-butyl perbenzoate, 1.5 gms (0.0065 mole) of t-butyl peroctoate and 300 gms (1.63 moles) of 2-ethylhexyl acrylate is added in 1 hour at 120° C. under a nitrogen atmosphere. The reaction mixture is digested at 120° C. for an additional 2 hours. The nitrogen purge is removed and a vacuum applied for 2 hours. The resulting product has an EEW of 233.7.

CATALYST A is a 70 weight percent solution of tetra-n-butylphosphonium acetate acetic acid complex in methanol.

THERMAL STABILITY TEST

The thermal stability test is run using a Brookfield Thermosel set at 232° C. The resin mixture (9 gms) is placed into the Thermosel cup which is then placed into the viscometer oven. When the resin mixture is fluid, the spindle (No. 21) is lowered into the resin and the viscometer motor started. The viscosity is determined and recorded as the initial viscosity. The resin mixture is left in the viscosity oven for 6 hours and the viscosity measured again and recorded as the final viscosity. The results are given in Table I.

PREPARATION OF REACTION PRODUCT OF EPOXY RESIN AND NONYL PHENOL

To a reaction vessel equipped with a stirrer, thermometer and nitrogen purge is added 588.2 gms (3.232 epoxy equivalents) of Epoxy Resin B and 711 gms (3.232 moles) of nonyl phenol and heated to 60° C. then added 0.9 g (0.0017 mole) of Catalyst A. The reaction temperature is increased to 170° C. and maintained for 5.25 hours. The resultant product has a percent epoxide of 0.53 and is referred to as Reaction Product A.

EXAMPLE 1

To a reaction vessel equipped with a stirrer, thermometer and nitrogen purge is added 96 gms (0.528 epoxy equivalent) of Epoxy Resin A, 64 gms (0.274 epoxy equivalent) of Epoxy Resin C and 69.3 gms (0.608 phenolic hydroxyl equivalent) of bisphenol A and heated to 90° C. whereupon 0.3 g (0.0006 mole) of Catalyst A is added. The reaction temperature is increased to 150° C. then heating stopped and the reaction mass exotherms to about 183° C. The temperature is increased to 185° C. and is maintained thereat until the reaction is completed, about 1 hour then 47.1 gms (0.174 mole) of stearic acid is added. The temperature is maintained at 185° C. for 2.67 hours. The resultant product has a percent epoxide of 0.18 (EEW=23,889).

EXAMPLE 2

To a reaction vessel equipped with a stirrer, thermometer and nitrogen purge is added 144 gms (0.788 epoxy equivalent) of Epoxy Resin A, 16 gms (0.068 epoxy equivalent) of Epoxy Resin C and 68.6 gms (0.602 phenolic hydroxyl equivalent) of bisphenol A and heated to 90° C. whereupon 0.3 g (0.0006 mole) of Catalyst A is added. The reaction temperature is increased to 150° C. then heating stopped and the reaction mass exotherms to about 190° C. The temperature is decreased to 185° C. and is maintained thereat until the reaction is completed, about 1 hour then 47.6 gms (0.216 mole) of nonyl phenol is added. The temperature is maintained at 185° C. for 2.45 hours. The resultant product has a percent epoxide of 0.78 (EEW=5513).

EXAMPLE 3

To a reaction vessel equipped with a stirrer, thermometer and nitrogen purge is added 96 gms (0.528 epoxy equivalent) of Epoxy Resin A, 64 gms (0.274 epoxy equivalent) of Epoxy Resin C and 75 gms (0.658 phenolic hydroxyl equivalent) of bisphenol A and heated to 90° C. whereupon 0.3 g (0.0006 mole) of Catalyst A is added. The reaction temperature is increased to 150° C. then heating stopped and the reaction mass exotherms to about 179° C. The temperature is increased to 185° C. and is maintained thereat until the reaction is completed, about 1.12 hours then 29 g (0.132 mole) of nonyl phenol is added. The temperature is maintained at 185° C. for 2.5 hours. The resultant product has a percent epoxide of 0.61 (EEW=7049).

EXAMPLE 4

To a reaction vessel equipped with a stirrer, thermometer and nitrogen purge is added 172.7 g (0.739 epoxy equivalent) of Epoxy Resin C, 55.3 g (0.485 phenolic hydroxyl equivalent) of bisphenol A and heated to 90° C. whereupon 0.3 g (0.0006 mole) of Catalyst A is added. The reaction temperature is increased to 150° C. then heating stopped and the reaction mass exotherms to about 176° C. The temperature is increased to 185° C. and is maintained thereat until the reaction is completed, about 1 hour then 50 g (0.227 mole) of nonyl phenol is added. The temperature is maintained at 185° C. for 2.37 hours. The resultant product has a percent epoxide of 0.76 (EEW=5658).

EXAMPLE 5

To a reaction vessel equipped with a stirrer, thermometer and nitrogen purge is added 96 g (0.528 epoxy equivalent) of Epoxy Resin A, 64 g (0.274 epoxy equivalent) of Epoxy Resin C, 62.8 g (0.551 phenolic hydroxyl equivalent) of bisphenol A and heated to 90° C. whereupon 0.3 g (0.0006 mole) of Catalyst A is added. The reaction temperature is increased to 150° C. then heating stopped and the reaction mass exotherms to about 176° C. The temperature is increased to 185° C. and is maintained thereat until the reaction is completed, about 1.28 hour then 49.6 g (0.226 mole) of nonyl phenol is added. The temperature is maintained at 185° C. for 3.08 hours. The resultant product has a percent epoxide of 0.7 (EEW=6143).

COMPARATIVE EXPERIMENT A

To a reaction vessel equipped with a stirrer, thermometer and nitrogen purge is added 96 g (0.528 epoxy equivalent) of Epoxy Resin A, 64 g (0.274 epoxy equivalent) of Epoxy Resin C, 75 g (0.658 phenolic hydroxyl equivalent) of bisphenol A and heated to 90° C. whereupon 0.3 g (0.0006 mole) of Catalyst A is added. The reaction temperature is increased to 150° C. then heating stopped and the reaction mass exotherms to about 174° C. The temperature is increased to 185° C. and is maintained thereat until the reaction is completed, about 1 hour. The resultant product has a percent epoxide of 2.46 (EEW=1748).

EXAMPLE 6

Various materials are blended with some of the previously prepared thermally stable epoxy resins of the present invention except the Comparative Experiment which is blended with its non-capped counterpart. The composition, softening temperature, viscosity and thermal stability are given in Table I.

TABLE I

| SAM. NO. | RESIN 1 Type grams | RESIN 2 Type/grams | SOFT POINT °C. | INITIAL VISCOSITY[a] cps/Pa.s | FINAL VISCOSITY[b] cps/Pa.s | % CHANGE |
|---|---|---|---|---|---|---|
| A* | Comp. Expt. A 12.2 | Epoxy Resin A/9.8 | 76.0 | 290/0.290 | 406/0.406 | 40.0 |
| B | Ex. 1 20 | Rxn Prod. A/2 | 100.1 | 614/0.614 | 609/0.609 | −0.8 |
| C | Ex. 2 15.4 | Rxn Prod. A/6.6 | 91.8 | 143/0.143 | 149/0.149 | 4.2 |
| D | Ex. 3 12.2 | Rxn Prod. A/9.8 | 97.7 | 409/0.409 | 413/0.413 | 1.2 |
| E | Ex. 4 16.7 | Rxn Prod. A/5.3 | 98.2 | 442/0.442 | 451/0.451 | 2.0 |
| F | EX. 5 15.9 | Rxn Prod. A/6.1 | 94.2 | 213/0.213 | 217/0.217 | 1.9 |

*Not an example of the present invention.
[a]The viscosity is determined at 450° F. (232° C.).
[b]The resins are aged for six hours at 450° F. (232° C.).

EXAMPLE 7

Paints are formulated from the thermoplastic resins and then tested for formulation hardness at 60° C. The formulation and results are given in Table II.

TABLE II

| Sample Number | Resin One Type/grams | Resin Two Type/grams | Filler, grams | Hardness |
|---|---|---|---|---|
| G | Ex. 1/20 | Rxn Prod. A*/2 | 14.6 | 19 |
| H | Ex. 2/28 | Rxn Prod. A*/12 | 26.67 | 18 |
| I | Ex. 3/20 | Rxn Prod. A*/16 | 24 | 21 |
| J | Ex. 4/22 | Rxn Prod. A*/7 | 19.3 | 21 |
| K | Ex. 5/26 | Rxn Prod. A*/10 | 24 | 19 |

*Reaction product of epoxy resin B and nonyl phenol as described on page 21.

The hardness is determined by making a filler mixture of 29.4% titanium dioxide, 29.4% calcium carbonate and 41.2% 200 mesh glass beads. The thermoplastic resin is placed into a glass bottle and then the filler mixture is added. This mixture is then placed into an oven at a temperature of 225° C. and allowed to melt. When melted the sample is mixed together then poured into an aluminum pan and allowed to cool to ambient temperature. After cooling the sample is then placed into an oven preset at a temperature of 60° C. and maintained for 1 hour then the hardness is determined using the device described earlier that has a 1096 g mass attached to the top. This device is placed on the sample and the hardness reading obtained after 15 seconds.

I claim:

1. A thermally stable, epoxy resin resulting from (A) reacting a composition comprising
  (1) the product resulting from reacting
    (a) the product resulting from reacting
      (i) at least one aromatic based epoxy resin having an average of more than one but not more than about 2.1 vicinal epoxy groups per molecule and an equivalent weight of not greater than about 225: with
      (ii) at least one unsaturated monofunctional carboxylic acid;
      wherein components (i) and (ii) are employed in an amount which provides a ratio of equivalents of component (ii) to equivalent of component (i) of from about 0.0087:1 to about 0.035:1: with
    (b) at least one unsaturated acrylate ester or methacrylate ester:
    wherein component (b) is employed in an amount of from about 5 to about 20 percent by weight of the combined quantity of components (a) and (b):
  (2) at least one phenolic compound having an average of more than 1 but not more than about 2 phenolic hydroxyl groups per molecule: and
  (3) optionally, at least one aromatic based epoxy resin having an average of more than 1 but not more than about 2.1 vicinal epoxy groups per molecule and an equivalent weight of not greater than about 225: and
  wherein components (1) and (3) are employed in quantities which provide a ratio of epoxide groups from component (3) to component (1) of from about zero:1 to about 12:1: and components (1), (2) and (3) are employed in quantities such that the resultant product has an epoxide equivalent weight (EEW) of from about 700 to about 2000; each of the aforementioned EEWs being calculated on the basis that the aromatic groups contained therein are free of substituent groups even if they do in fact contain substituent groups; and (B) reacting the product resulting from (A) with
  (4) a reactant compound having only one group per molecule which is reactive with a vicinal epoxy group selected from —OH, —SH, —COOH and —CO—O—CO— groups; wherein component (4) is employed in an amount which provides a ratio of groups reactive with a vicinal epoxy group to vicinal epoxy group contained in the product from (A) from about 0.85:1 to about 1.1:1.

2. An epoxy resin of claim 1 wherein (a) components (1-a-i) and (3) have an EEW of not greater than about 200:

(b) components (1) and (3) are employed in quantities which provide a ratio of epoxy groups from component (3) to epoxy groups from component (1) of from about 0.5:1 to about 5:1:

(c) components (1), (2) and (3) are employed in quantities such that the resultant product has an EEW of from about 800 to about 1800;

(d) component (1-b) is employed in an amount of from about 7 to about 19 percent by weight of the combined quantity of components (1-a) and (1-b); and (e) component (4) is employed in an amount which provides a ratio of groups reactive with a vicinal epoxy group to vicinal epoxy group contained in the product from (A) of from about 0.9:1 to about 1:1.

3. An epoxy resin of claim 2 wherein (a) components (1-a-i) and (3) have an EEW of not greater than about 195;

(b) components (1) and (3) are employed in quantities which provide a ratio of epoxy groups from component (3) to epoxy groups from component (1) of from about 1:1 to about 2:1;

(c) components (1), (2) and (3) are employed in quantities such that the resultant product has an EEW of from about 850 to about 1700;

(d) component (1-b) is employed in an amount of from about 10 to about 19 percent by weight of the combined quantity of components (1-a) and (1-b); and (e) component (4) is employed in an amount which provides a ratio of groups reactive with a vicinal epoxy group to vicinal epoxy group contained in the product from (A) of from about 0.95:1 to about 1:1.

4. An epoxy resin of claims 1, 2 or 3 wherein (a) components (1-a-i) and (3) are, independently, a diglycidyl ether of a bisphenol or mixture thereof;

(b) component (1-a-ii) is acrylic acid, methacrylic acid or a combination thereof;

(c) component (1-b) is a 4-10 carbon atom alkyl or hydroxyalkyl ester of acrylic or methacrylic acid;

(d) component (2) is a bisphenol or mixture of bisphenols; and (e) component (4) is a monocarboxylic acid or a monohydric phenol.

5. An epoxy resin of claim 4 wherein (a) components (1-a-i) and (3) are diglycidyl ethers of bisphenol A;

(b) component (1-b) is 2-ethylhexyl acrylate;

(c) component (2) is bisphenol A; and (d) component (4) is nonyl phenol.

6. A paint formulation comprising a composition of claim 4 and at least one of fillers, pigments, dyes, solvents or diluents.

7. A paint formulation of claim 6 wherein said composition contains a filler and a pigment or dye.

8. A paint formulation of claim 7 wherein at least one of said fillers is a reflective material.

9. A paint formulation of claim 8 wherein said reflective material is glass beads.

10. A paint formulation comprising a composition of claim 5 and at least one of fillers, pigments, dyes, solvents or diluents.

11. A paint formulation of claim 10 wherein said composition contains a filler and a pigment or dye.

12. A paint formulation of claim 11 wherein at least one of said fillers is a reflective material.

13. A paint formulation of claim 12 wherein said reflective material is glass beads.

* * * * *